(12) United States Patent
Sawadsky et al.

(10) Patent No.: US 7,966,285 B2
(45) Date of Patent: Jun. 21, 2011

(54) SYNCHRONOUS PEER-TO-PEER MULTIPOINT DATABASE SYNCHRONIZATION

(75) Inventors: Nicholas Justin Sawadsky, Vancouver (CA); Daniel Yilin Shi, Vancouver (CA); Andrew Edward Block, Vancouver (CA); Michael Anthony Blackstock, Coquitlam (CA); Henricus Gerardus Spaay, Vancouver (CA); Desiree Paula Rodriguez, Vancouver (CA)

(73) Assignee: Ionaphal Data Limited Liability Company, Wilmington, DE (US)

( * ) Notice: Subject to any disclaimer, the term of this patent is extended or adjusted under 35 U.S.C. 154(b) by 535 days.

(21) Appl. No.: 12/077,887

(22) Filed: Mar. 19, 2008

(65) Prior Publication Data
US 2008/0243944 A1 Oct. 2, 2008

Related U.S. Application Data

(63) Continuation of application No. 11/196,567, filed on Aug. 2, 2005, now Pat. No. 7,366,743, which is a continuation of application No. 10/090,613, filed on Mar. 6, 2002, now abandoned.

(51) Int. Cl.
G06F 17/30 (2006.01)
(52) U.S. Cl. ......... 707/610; 707/640; 707/704; 707/803
(58) Field of Classification Search .................. 707/616, 707/619, 633, 704, 803
See application file for complete search history.

(56) References Cited

U.S. PATENT DOCUMENTS

| | | | |
|---|---|---|---|
| 5,261,094 A | 11/1993 | Everson et al. | |
| 5,684,990 A | 11/1997 | Boothby | |
| 5,706,431 A | 1/1998 | Otto | |
| 5,724,556 A * | 3/1998 | Souder et al. | 703/2 |
| 5,737,601 A | 4/1998 | Jain et al. | |
| 5,758,150 A * | 5/1998 | Bell et al. | 707/610 |
| 5,758,355 A * | 5/1998 | Buchanan | 707/610 |
| 5,781,912 A * | 7/1998 | Demers et al. | 707/619 |
| 5,806,075 A | 9/1998 | Jain et al. | |
| 5,870,765 A | 2/1999 | Bauer et al. | |
| 5,884,328 A * | 3/1999 | Mosher, Jr. | 707/610 |
| 5,926,816 A | 7/1999 | Bauer et al. | |
| 5,937,414 A * | 8/1999 | Souder et al. | 707/616 |
| 5,970,502 A | 10/1999 | Salkewicz et al. | |
| 6,009,427 A | 12/1999 | Wolff | |
| 6,081,806 A | 6/2000 | Chang et al. | |
| 6,202,085 B1 | 3/2001 | Benson et al. | |
| 6,226,650 B1 | 5/2001 | Mahajan et al. | |
| 6,230,164 B1 | 5/2001 | Rekieta et al. | |
| 6,234,715 B1 | 5/2001 | Ono | |

(Continued)

OTHER PUBLICATIONS

Definition: Collaborative Networks, from Wikipedia, Internet: http://en.wikipedia.org/wiki/collaborative_networks, printed Dec. 21, 2006, 1 page.

(Continued)

*Primary Examiner* — Shahid A Alam
(74) *Attorney, Agent, or Firm* — McDonnell Boehnen Hulbert & Berghoff LLP

(57) ABSTRACT

A method of synchronizing databases between multiple users in a peer-to-peer network is disclosed. The method comprises extracting changes from a source database of one of the users. Next, the changes are compressed and sent to the other users in the peer-to-peer network in parallel. Finally, the changes are decompressed and replicated on the database of each of the other users. In this respect, the databases of the other users will contain all changes from the source database.

35 Claims, 7 Drawing Sheets

U.S. PATENT DOCUMENTS

| | | | |
|---|---|---|---|
| 6,243,717 B1 | 6/2001 | Gordon et al. | |
| 6,253,213 B1 | 6/2001 | Vanderschaaf | |
| 6,301,477 B1 | 10/2001 | Lennert et al. | |
| 6,304,881 B1 | 10/2001 | Halim et al. | |
| 6,311,187 B1 | 10/2001 | Jeyaraman | |
| 6,324,693 B1 | 11/2001 | Brodersen et al. | |
| 6,330,568 B1 | 12/2001 | Boothby | |
| 6,374,262 B1 | 4/2002 | Kodama | |
| 6,526,417 B1 | 2/2003 | Perry | |
| 6,532,479 B2 * | 3/2003 | Souder et al. | 707/633 |
| 6,662,196 B2 * | 12/2003 | Holenstein et al. | 707/704 |
| 6,691,139 B2 | 2/2004 | Ganesh et al. | |
| 6,704,737 B1 | 3/2004 | Nixon et al. | |
| 6,732,111 B2 * | 5/2004 | Brodersen et al. | 707/803 |
| 6,892,207 B2 * | 5/2005 | McKay et al. | 707/803 |
| 6,925,476 B1 * | 8/2005 | Multer et al. | 707/610 |
| 6,980,988 B1 * | 12/2005 | Demers et al. | 707/704 |
| 7,103,586 B2 * | 9/2006 | Holenstein et al. | 707/704 |
| 7,433,885 B2 * | 10/2008 | Jones | 707/803 |
| 7,526,575 B2 * | 4/2009 | Rabbers et al. | 709/248 |
| 7,552,123 B2 * | 6/2009 | Wade et al. | 707/791 |
| 7,818,285 B1 * | 10/2010 | Klatt et al. | 707/600 |
| 2001/0014893 A1 | 8/2001 | Boothby | |
| 2002/0073109 A1 | 6/2002 | Toriumi | |
| 2002/0103816 A1 | 8/2002 | Ganesh et al. | |
| 2002/0147774 A1 | 10/2002 | Lisiecki et al. | |
| 2003/0084361 A1 | 5/2003 | Lawrence | |

OTHER PUBLICATIONS

Definition: Peer-to-Peer, from Wikipedia, Internet: http://en.wikipedia.org/wiki/P2p, printed Dec. 11, 2006, 9 pages.

Good, Robin, "P2P As Collaborative Networks," Kolabora News, Online collaboration-Internet: http://www.kolabora.com/news/2004/01/08/p2p_as_collaborative_networks.htm# (printed Dec. 21, 2006), Jan. 8, 2004, 3 pages.

Oracle 7 Server Distributed System, vol. II: Replicated Data, Release 7.3, Feb. 1996, Oracle.

\* cited by examiner

SYNCHRONOUS PEER-TO-PEER MULTIPOINT DATABASE SYNCHRONIZATION

CROSS REFERENCE TO RELATED APPLICATION

This application is a continuation of and claims priority to application Ser. No. 11/196,567, filed on Aug. 2, 2005, which is based on parent application Ser. No. 10/090,613, filed on Mar. 6, 2002 entitled "Synchronous Peer-To-Peer Multipoint Database Synchronization" in the name of the same inventors and commonly owned herewith.

BACKGROUND OF THE INVENTION

The present invention generally relates to database synchronization and more particularly to a system and method of database synchronization over a peer-to-peer network.

With the popularity of handheld computing devices (i.e., PDA's, cell phones, etc. . . . ) increasing, there is becoming a greater need and ability to share information between devices. Computing networks can be established between the devices so that collaborative information can be shared. The computing devices can form peer-to-peer networks between one another such that information can be shared without the use of a central server to store a database of information.

Currently, in the prior art, computers use databases stored on a central database server in order to communicate information. Database systems have replication and synchronization capabilities in order to update information on client systems. These synchronization capabilities are usually restricted to simple two-point exchanges between clients and servers. The synchronization and replication capability require the database server to effect dataset reconciliation between multiple users.

When multiple users without access to the database server wish to synchronize their databases, it must be done by a series of 2-way exchanges. For instance, information must flow in both directions between users in order to synchronize the dataset. At the very least, this involves 2*n combinations of replications and synchronization. As databases get large, the synchronization and replication procedures between the users becomes tedious and time consuming. Moreover, without the use of a central database server, one user must manage the entire process and ensure that all parties have been included in the synchronization and that data integrity is not lost.

U.S. Pat. No. 6,295,541, entitled "Systems and Methods for Synchronizing Two or More Datasets" describes a method whereby a reference database is maintained which the other devices synchronize to when available. The patent describes a system whereby devices synchronize to the reference database at different times when they are online such that synchronization occurs serially between devices. Furthermore, only one device is considered the reference database such that only one device controls the synchronization process.

The present invention addresses the above-mentioned deficiencies in database reconciliation by providing a peer-to-peer method for synchronizing two or more copies of databases without server mediation in real-time. In this respect, the present invention provides a method of synchronization wherein there is no asynchronous storage of interim reference datasets. The present invention provides synchronization in parallel so that several users can simultaneously synchronize individual varying datasets without having to serially exchange and aggregate changes. Furthermore, the present invention allows for any user to initiate synchronization such that one user does not need to be control.

BRIEF SUMMARY OF THE INVENTION

In accordance with the present invention, there is provided a method of synchronizing databases between multiple users in a peer-to-peer network. The method is initiated by one member of a group of peers. The other group members first extract their changes from their local copy of the database, compress the changes, and send those changes to the initiator. The initiator then decompresses their changes and replicates them into its local database. The initiator then extracts all changes (including those received from other group members) from the local database. Next, the changes are compressed and sent to the other users in the peer-to-peer network. Finally, the changes are decompressed and replicated on the database of each of the other users. In this respect, the databases of each group member will contain all changes from the databases of all the group members.

The above description describes a bilateral synchronization, in that changes are both sent and received from each peer. A unilateral synchronization is also possible, which consists of either the first half (receiving changes) or the second half (sending changes) of the above description. It will be recognized that the process can be initiated and performed by any user in the peer-to-peer network. In the preferred embodiment of the present invention, the transfer of the changes between the multiple users is done in parallel, although it may possibly be sequential. The transfer can be performed over a wired or wireless network.

In accordance with the present invention, there is also provided a system for synchronizing databases of multiple users. The system includes a plurality of computers in a peer-to-peer network wherein each computer has a database and software configured to provide synchronization. The software is configured to extract changes from the local database of each of the initiator's peers. The peers' changes are sent to the initiator in parallel as they finish being extracted. Each peer's changes are replicated into the initiator's database. Then all changes (including those received from the peers) are extracted from the initiator's database. Next, the software sends the changes in parallel to the other users of the peer-to-peer network. Finally, the changes are replicated by the software on each database of the other users in order to synchronize the databases.

BRIEF DESCRIPTION OF THE DRAWINGS

These as well as other features of the present invention will become more apparent upon reference to the drawings wherein.

DETAILED DESCRIPTION OF THE INVENTION

Figure 2:
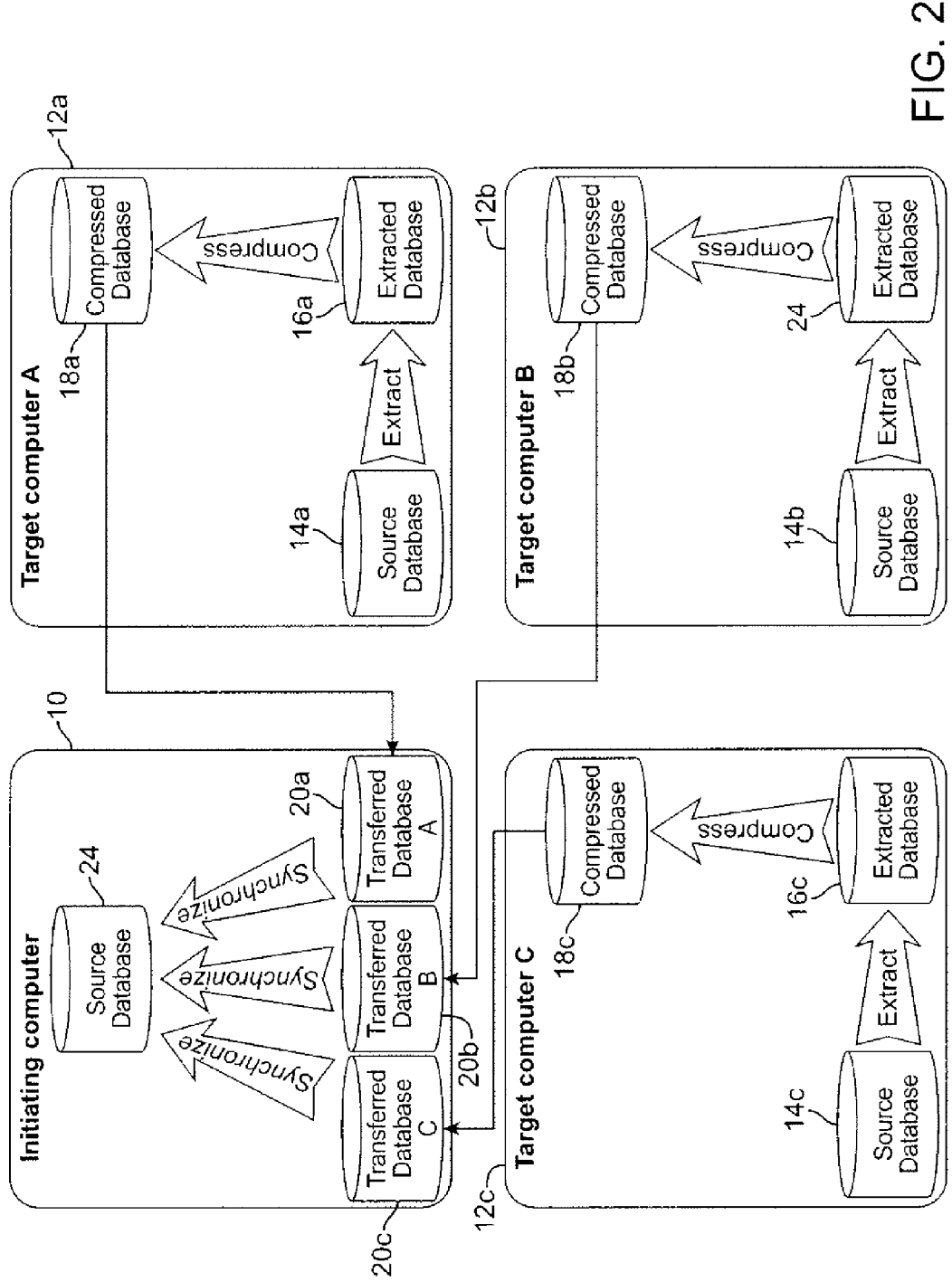
FIG. 2 is a diagram illustrating unilateral database replication from multiple target computers to the initiating computer.

Referring now to the drawings wherein the showings are for purposes of illustrating a preferred embodiment of the present invention only, and not for purposes of limiting the same, FIG. 2 shows unilateral database replication between an initiating computer 10 and target computers 12a, 12b and 12c according to the present invention. Both the initiating computer 10 and the target computers 12a, 12b, and 12c are computing devices having a memory and capable of storing and processing information. For instance the computing devices may be PDA's (i.e., Personal Digital Assistants) which are in electronic communication with one another through a peer-to-peer network. The network may be a wireless network such as Bluetooth, or could be a wired network such as an Ethernet. In either case, the peer-to-peer network provides electronic communication between the initiating computer 10 and the target computers 12 without the use of a server.

The initiating (source) computer 10 is synchronized with the other computers 12 by the transfer of database information from the target computers 12 to the initiating computer 10. As seen in FIG. 2, each of the target computers 12 transfer information to the initiating computer 10 in the same manner. Accordingly, the description below will be for the transfer of database information from target computer 12a to source computer 10, yet the process is identical for the transfers between target computers 12b and 12c to source computer 10. As will be further explained below, the processing and transfers may occur in parallel for each of the target computers 12a, 12b, and 12c to the initiating computer 10.

The process for synchronizing the target computers 12 to the initiating computer 10 begins by the initiating computer 10 sending out a synchronization request to the target computers 12. The synchronization command informs the target computers that the initiating computer 10 wishes to synchronize databases with them. It will be recognized that any computer in the network may be the initiating computer such that it is possible for any computer to start the synchronization process. The term initiating computer designates the computer that wishes the synchronization process to begin.

Figure 1:
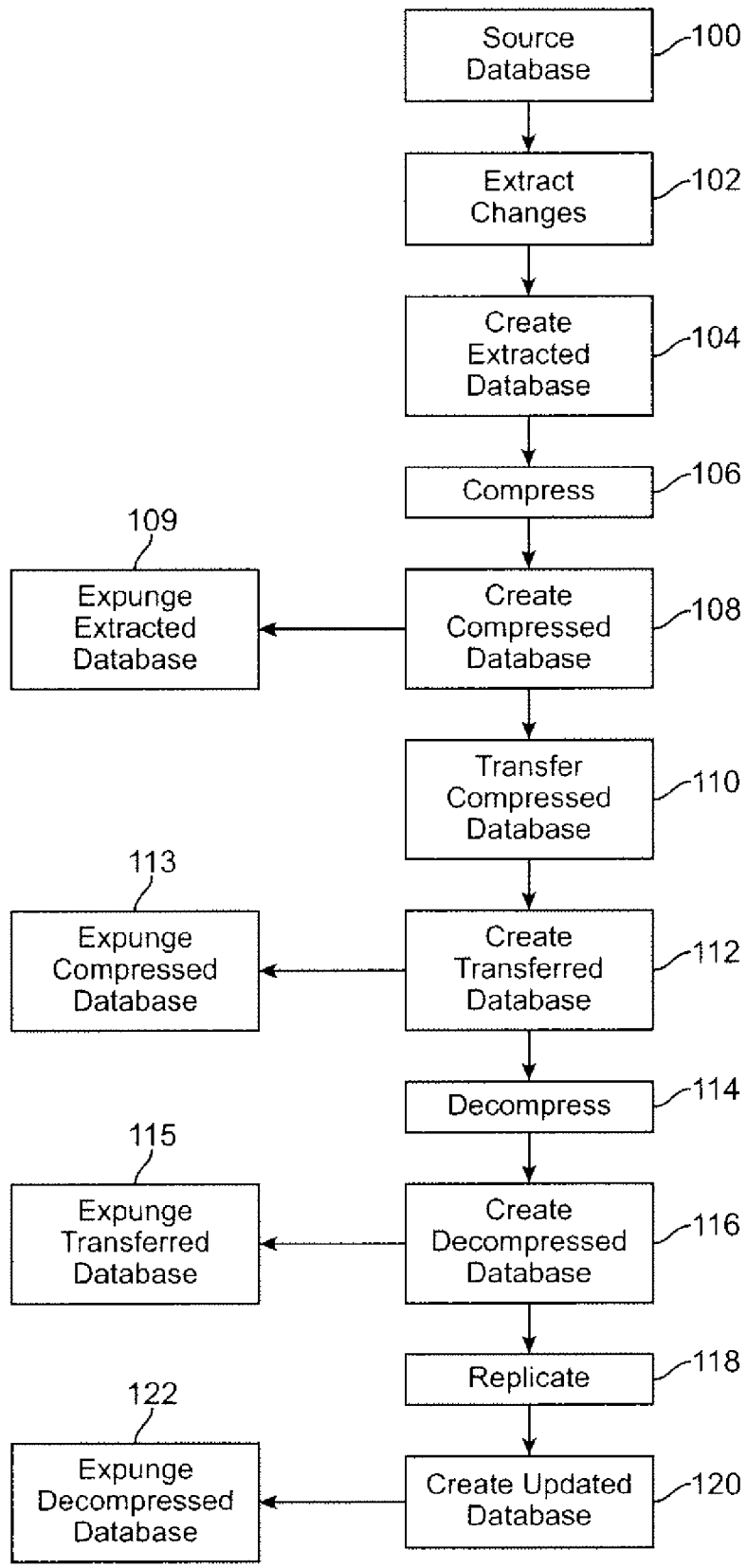
FIG. 1 is a flowchart illustrating a method of unilateral database synchronization from a target computer to an initiating computer according to the present invention.

Referring to FIGS. 1 and 2, in step 100, the target computer 12a has a source database 14a that is created in memory (i.e., hard drive, RAM, etc. . . . ). The source database 14a contains information which is shared between the target computer 12a and the other computing devices (i.e. computers 12b, 12c and 10). Next, in step 102, any changes to the source database 14a are extracted to create a temporary extracted database 16a containing at least all relevant changes to both the target computer 12a and the initiating computer 10. The extracted database 16a corresponds to the replica source 14a stored on the target computer 12a. All changes to the source database 14a from a user-specified date and time, or from the last time a synchronization occurred, are extracted and copied to the extracted database 16a. Accordingly, as seen in step 104, the extracted database 16a is created by extracting and copying the changes to the source database 14a. The extraction and copying is performed using the database API of the target computer 12a if such an API is available. In the case where no such API is available, changes are tracked as data is written to each database and extracted by the synchronization system itself.

Next, the extracted database 16a is compressed in step 106 to create a compressed database 18a in step 108. The compressed database 18a is created by using well known compression techniques on the extracted database 16a. Once the compressed database 18 is created, then the extracted database 16a is expunged in step 109.

Referring to step 110, the compressed database 18a is transferred to the initiating computer 10. Specifically, the file of the compressed database 18a is transferred to the initiating computer 10 in response to a request using any well known file transfer technique over any type of network, as previously described. Each of the target computers 12 will transfer information to the initiating computer 10 in parallel or in sequence when it is not possible to perform parallel communications. Typically, the compressed database 18a is transferred to a temporary transferred database 20a that is created on the initiating computer 10 in step 112. Once the transfer is complete, in step 113, the compressed database 18a on the target computer 12a is expunged.

Figure 4:
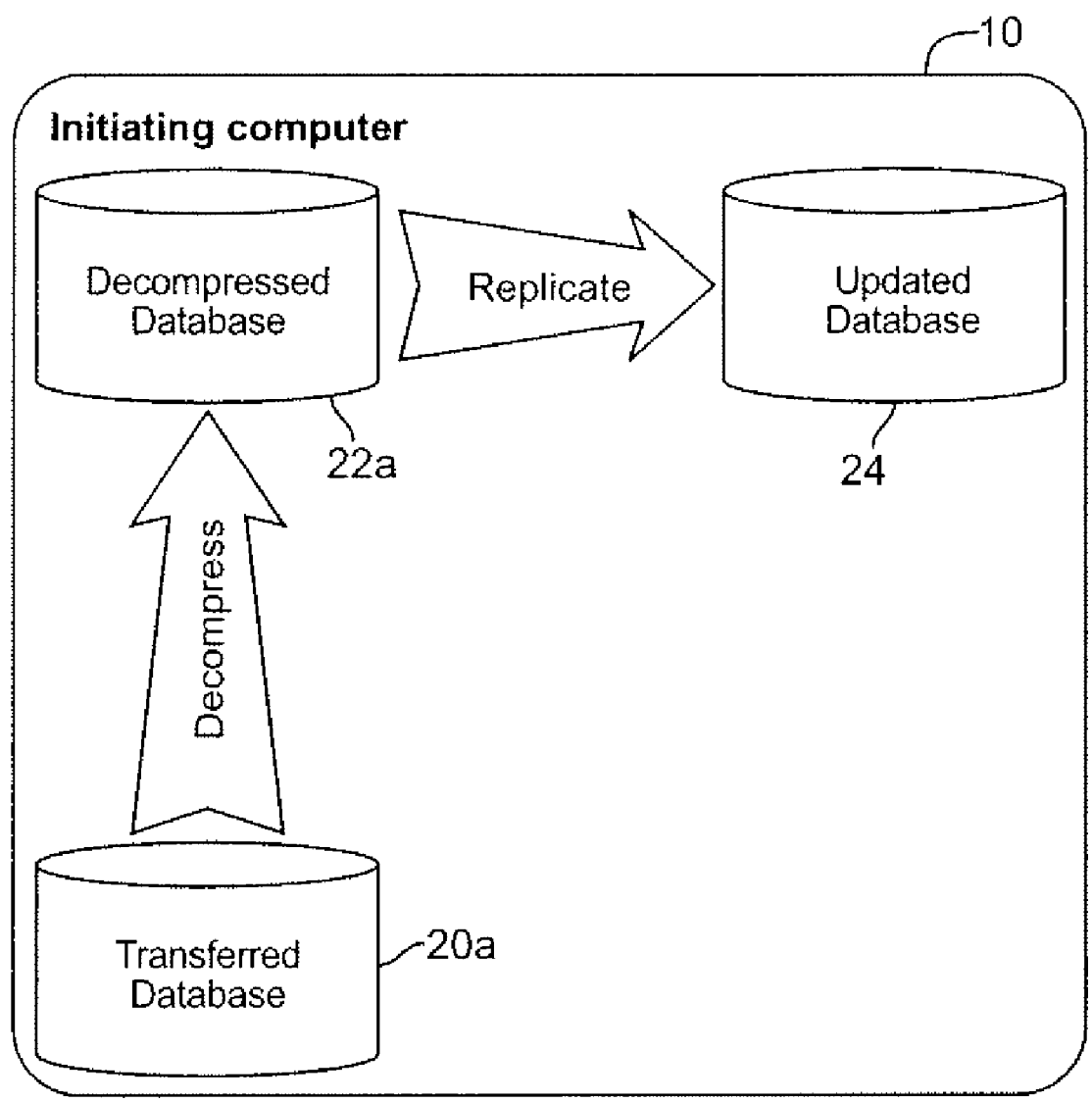
FIG. 4 illustrates the synchronization process on the initiating computer.

Once the transferred database 20a has been created on the initiating computer 10, the transferred database 20a is synchronized with the source database 24 of the initiating computer 10. Specifically, in step 114 of FIG. 1, the transferred database 20a is decompressed on the initiating computer 10, as seen in FIG. 4. The transferred database 20a is decompressed using a complementary decompression technique to that of step 106. Accordingly, in step 116, a decompressed database 22a is created on the initiating computer 10. Once the decompressed database 22a is created, then the transferred database 20a is expunged in step 115.

The decompressed database 22a is then replicated with the source database 24 of the initiating computer 10 in step 118. This operation is performed using the database API of the initiating computer 10 if such an API is available. In the case where no such API is available, replication is performed by the synchronization system itself. The process of replication causes the changes copied in the extracted database 16a to be incorporated into the source database 24 of the initiating computer 10. Once the decompressed database 22a is replicated onto the source database 24, the updated source database 24 is created in step 120 which has the changes and is identical to the source database 14a. Finally, the decompressed database 22a is expunged in step 122.

Each time a target computer 12 sends changes to the initiating computer 10, the synchronization process previously described (i.e., transfer, compression, decompression and replication) are completed in full before another synchronization from another target computer 12 is processed.

The above-described procedure is operative to send changes from the target computers 12 to an initiating computer 10. This procedure typically occurs when an initializing user wishes to receive changes from the other computers. However, the procedure can also be used if the initializing user wishes to transfer changes to other computers. In that instance, changes from the database of the initiating computer 10 would be transferred to the other computers 12a, 12b, and 12c.

Figure 3:
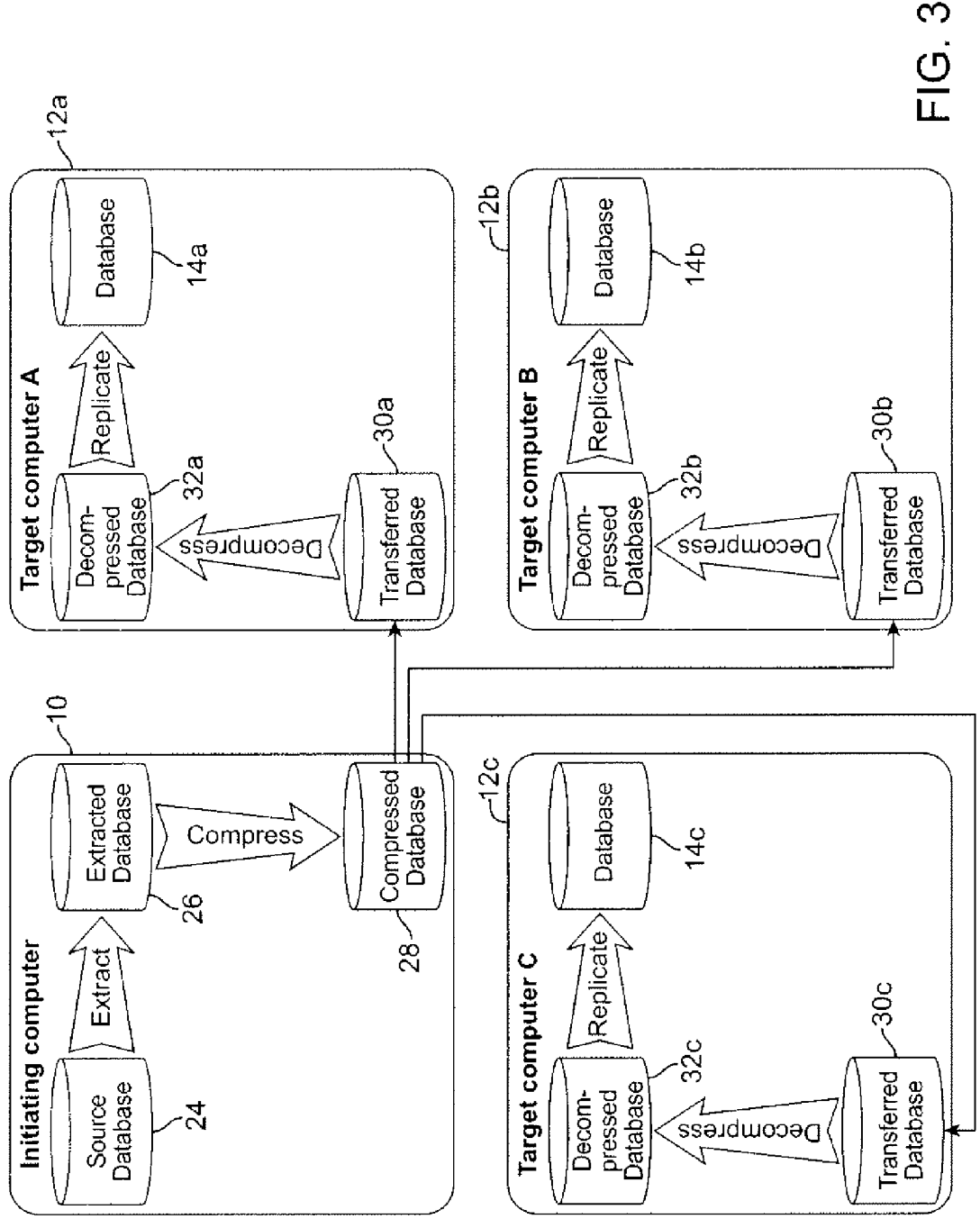
FIG. 3 is a diagram illustrating unilateral database replication from the initiating computer to multiple target computers.

Referring to FIG. 3, a diagram for the unilateral synchronization of multiple computers from the initiating computer 10 to target computers 12 is shown. Synchronization between the initiating computer 10 and target computers 12 occurs in parallel. Each target computer 12 has a transferred database, a decompressed database, and a target database that are created during the process of synchronization.

Figure 7:
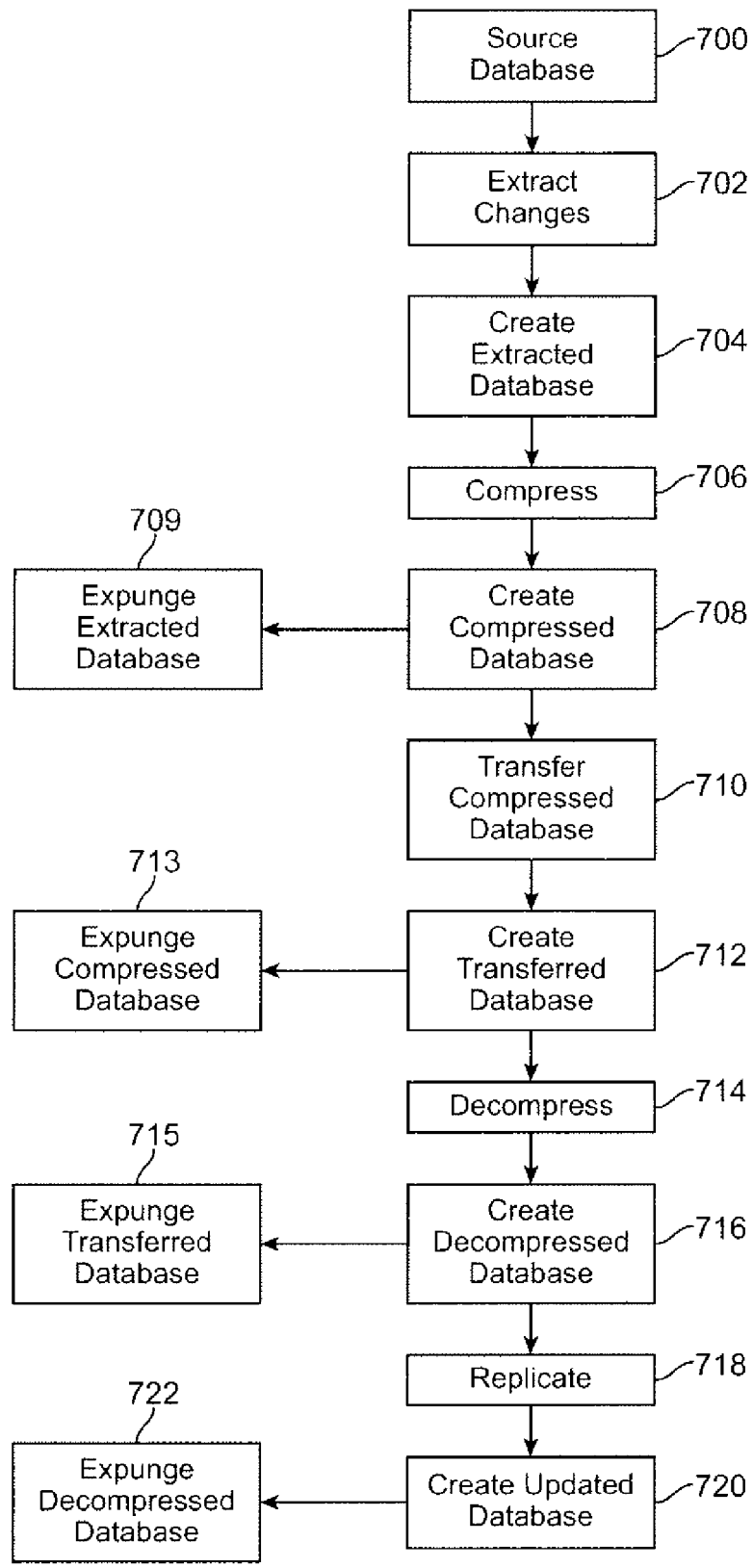
FIG. 7 is a flowchart illustrating a method of unilateral database synchronization from the initiating computer to the target computer.

Referring to FIGS. 3 and 7, the process for synchronizing the target computers 12 to the initiating computer 10 is similar to the process of synchronization described in FIG. 1. For example, the process begins with the initiating computer 10 sending a synchronization request to the target computers 12a, 12b, and 12c informing them that the initiating computer 10 wishes to send them changes to their databases. The synchronization process proceeds according to FIG. 7 such that changes in the source database 24 of the initiating computer 10 are extracted in step 702 to create an extracted database 26 in step 704. In step 706, the extracted database 26 is compressed to create a compressed database 28 in step 708. Once the compressed database 28 is created, the extracted database 26 is expunged in step 709. The compressed database 28 is transferred to the target computers 12a, 12b, and 12c in parallel over the computer network.

Each of the target computers 12a, 12b, and 12c receives the compressed database 28 and creates a respective transferred database 30a, 30b, and 30c. For simplicity, the following description will be for target computer 12a. However, it will be recognized that the following synchronization process occurs in any of the target computers (i.e., 12b, and 12c) synchronizing to the initiating computer 10. After the compressed database 28 is transferred and the transferred database 30a is created on the target computer 12a, then the compressed database 28 on the initiating computer 10 is expunged in step 713. In step 714, the compressed database 30a on the target computer 12a is decompressed to create a decompressed database 32a in step 716. The transferred database 30a is then expunged in step 715. The changes from the source database 24 are then replicated onto the database 14a of target computer 12a in step 718. In this regard, the database 14a will be updated with the changes from initiating computer 10, as seen in step 720. Finally, the decompressed database 32a is expunged from the target computer 12a.

The above-described method is concurrently performed on each of the target computers 12a, 12b, and 12c such that synchronization occurs simultaneously. Accordingly, the synchronization process of the present invention is a parallel method whereby each of the target computers 12 can synchronize with the initiating computer 10 quickly.

Figure 5:
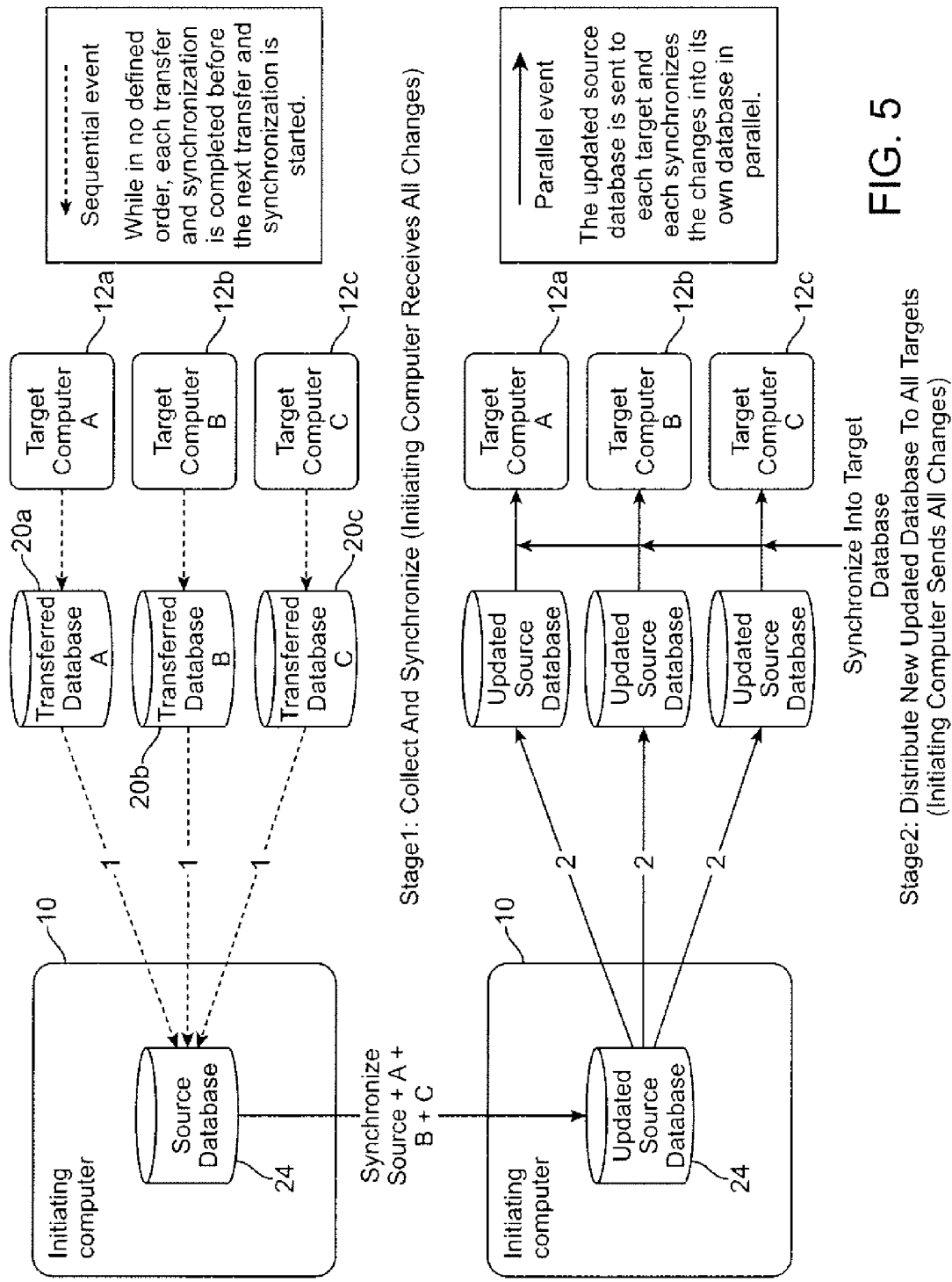
FIG. 5 is a diagram illustrating bilateral database replication between target computers and the initiating computer.

A bilateral database replication between an initiator and n peers consists of first n unilateral replications conducted in parallel to replicate all of the peers' changes into the initiator's database, followed by another n unilateral replications, again conducted in parallel, to replicate the accumulated changes from the initiator's database into the peers' local databases. Referring to FIG. 5, the initiating computer 10 receives changes from each of the target computers 12 in a sequential manner through the process described for FIG. 2. While in no defined order, each transfer and synchronization is completed before the next transfer and synchronization is started. For example, the synchronization process from target computer 12a to the transferred database 20a and synchronization to source database 24 will be completed before the next synchronization process from either target computer 12b or 12c. Once all of the target computers 12 have synchronized their changes to the source database 24, then the changes will be sent back to all of the target computers 12 in order to fully synchronize each target computer 12 to one another. Specifically, the source database 24 is now updated with the changes from each of the target computers 12. The initiating computer 10 will send all of its changes to the to the target computers 12 through a parallel manner as described for FIG. 3. The updated source database 24 is sent to each target computer 12 and each target computer 12 synchronizes the changes into it own database 14 in parallel. Accordingly, complete synchronization of all databases (i.e., initiating computer 10 and target computers 12) occurs in a two-stage process (bi-lateral exchange).

Even though the above-mentioned synchronization process for multiple computers has been described as being between an initiating and target computers, it will be recognized that any computer in the peer-to-peer network can begin the synchronization process. The computer that initiates the process will push and pull the transfer of files as needed. Furthermore, during multi-user synchronization, if any computer (other than the initiator) disappears from the network or cancels the process, the synchronization process can still proceed between the other computers.

Figure 6:
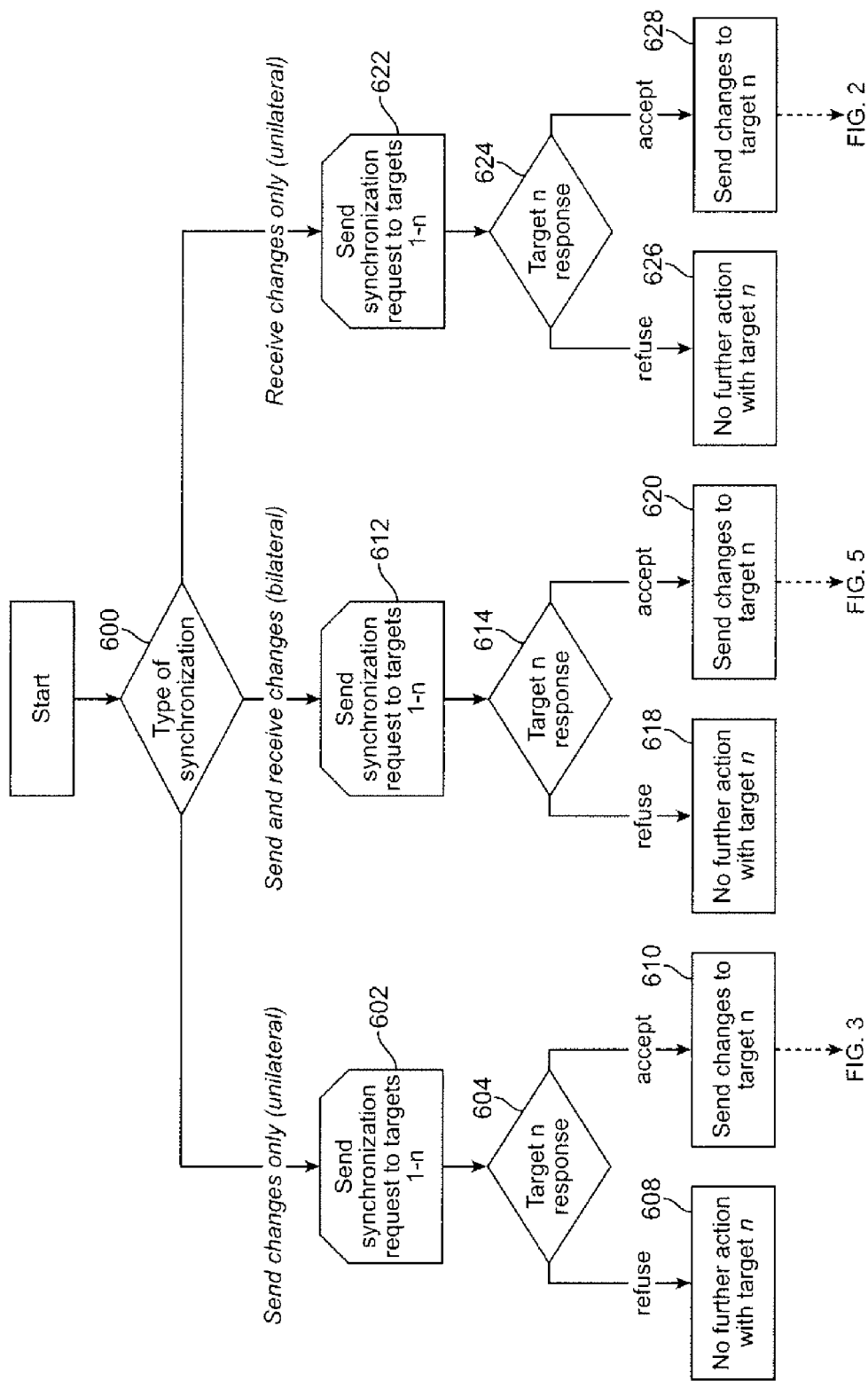
FIG. 6 is a diagram illustrating the selection of database replication techniques by a user.

Referring to FIG. 6, a flowchart showing possible synchronization processes is shown. As previously mentioned, either bilateral or unilateral synchronization between the initiating computer 10 and the target computers 12 can occur. The user determines the type of synchronization process in step 600 of FIG. 6. The user can send changes from the initiating computer as described for FIG. 3, receive and send changes as described for FIG. 5, or receive changes as described for FIG. 2. If the user decides to send changes only from the initiating computer 10 to target computers 12 (i.e., unilateral exchange), then in step 602, synchronization requests are sent from the initiating computer 10 to 1-n target computers 12. Next, each target computer 12 will respond to the request in step 604. Specifically, a target computer 12 can refuse the request such that synchronization does not occur. If the target computer 12 refuses, then in step 608, there is no further action with those target computers 12 which refuse synchronization. However, in step 610, target computers 12 which accept the synchronization request proceed to receive changes as previously described for FIG. 3.

If the user wishes to send and receive changes (i.e., indicating a bilateral exchange), then the initiating computer 10 will send the synchronization request to the 1-n target computers 12 as shown in step 612. Next, each of the target computers 12 will respond to the request by either refusing or accepting the request. If a target computer 12 refuses the request, then in step 618 no further action is taken with that target computer 12. However, if the target computer 12 accepts the request, then the bilateral synchronization process shown in FIG. 5 commences and the target computer 12 will begin sending changes to the initiating computer 10 and then proceed to receive all changes therefrom, as shown in step 620.

Referring to FIG. 6, if the user wishes just to receive changes only (i.e., unilateral exchange), then the initiating computer 10 will send the synchronization request to the target computers 12 in step 622. Next, the target computers 12 will respond in step 624. If a target computer 12 refuses to send changes to the initiating computer 10, then no further action will occur, as shown in step 626. However, if the target computer 12 agrees to the synchronization process, then in step 628, the changes are sent to the initiating computer as described for FIG. 2.

Additional modifications and improvements of the present invention may also be apparent to those of ordinary skill in the art. Thus, the particular combination of parts described and illustrated herein is intended to represent only a certain embodiment of the present invention, and not intended to serve as a limitation of alternative devices within the spirit and scope of the invention.

The invention claimed is:

1. An article of manufacture containing a non-transitory computer-readable storage medium having software stored thereon, the software comprising:
    software for receiving a synchronization request;
    software for determining that the synchronization request is to be accepted or refused;

software for extracting changes from a local database in response to accepting the synchronization request;
software for sending the extracted changes;
software for receiving aggregated changes, wherein the aggregated changes incorporate the extracted changes; and
software for updating the local database with the aggregated changes.

2. The article of manufacture of claim 1, wherein the extracted changes are compressed before being sent.

3. The article of manufacture of claim 1, wherein the aggregated changes are decompressed before updating the local database.

4. The article of manufacture of claim 1, wherein the extracted changes are expunged after being sent.

5. The article of manufacture of claim 1, wherein the aggregated changes are expunged after updating the local database.

6. An article of manufacture containing a non-transitory computer-readable storage medium having software stored thereon, the software comprising:
software for sending a synchronization request;
software for receiving extracted changes in response to acceptance of the synchronization request;
software for updating a local database with the extracted changes;
software for extracting aggregated changes from the local database, wherein the aggregated changes comprise the extracted changes; and
software for sending the aggregated changes.

7. The article of manufacture of claim 6, wherein the software for updating the local database comprises software for updating the local database with a first set of extracted changes in the local database before beginning to update the local database with a second set of extracted changes.

8. The article of manufacture of claim 6, wherein the aggregated changes are compressed before being sent.

9. The article of manufacture of claim 6, wherein the extracted changes are decompressed before updating the local database.

10. The article of manufacture of claim 6, wherein the extracted changes are expunged after updating the local database.

11. The article of manufacture of claim 6, wherein the aggregated changes are expunged after being sent.

12. An apparatus comprising:
means for receiving a synchronization request;
means for determining that the synchronization request is to be accepted or refused;
means for extracting changes from a local database in response to accepting the synchronization request;
means for sending the extracted changes;
means for receiving aggregated changes, wherein the aggregated changes incorporate the extracted changes; and
means for updating the local database with the aggregated changes.

13. The apparatus of claim 12, wherein the extracted changes are compressed before being sent.

14. The apparatus of claim 12, wherein the aggregated changes are decompressed before updating the local database.

15. The apparatus of claim 12, wherein the extracted changes are expunged after being sent.

16. The apparatus of claim 12, wherein the aggregated changes are expunged after updating the local database.

17. An apparatus comprising:
means for storing data;
means for sending a synchronization request;
means for receiving extracted changes in response to acceptance of the synchronization request;
means for updating the means for storing data with the extracted changes;
means for extracting aggregated changes from means for storing data, wherein the aggregated changes comprise the extracted changes; and
means for sending the aggregated changes.

18. The apparatus of claim 17, wherein means for updating comprise means for updating the means for data storage with a first set of extracted changes before beginning to update the means for data storage with a second set of extracted changes.

19. The apparatus of claim 17, wherein the aggregated changes are compressed before being sent.

20. The apparatus of claim 17, wherein the extracted changes are decompressed before updating the means for data storage.

21. The apparatus of claim 17, wherein the extracted changes are expunged after updating the means for data storage.

22. The apparatus of claim 17, wherein the aggregated changes are expunged after being sent.

23. A method comprising:
at a computer, receiving a synchronization request;
at the computer, determining that the synchronization request is to be accepted or refused;
at the computer, extracting changes from a local database in response to accepting the synchronization request;
sending the extracted changes from the computer;
receiving aggregated changes at the computer, wherein the aggregated changes incorporate the extracted changes; and
at the computer, updating the local database with the aggregated changes.

24. The method of claim 23, wherein the computer is associated with a plurality of computers, and wherein the aggregated changes comprise changes from at least one computer in the plurality of computers other than the computer.

25. The method of claim 23, wherein the extracted changes are compressed at the computer before being sent.

26. The method of claim 23, wherein the aggregated changes are decompressed at the computer before updating the local database.

27. The method of claim 23, wherein the extracted changes are expunged at the computer after being sent.

28. The method of claim 23, wherein the aggregated changes are expunged after updating the local database.

29. A method comprising:
sending a synchronization request from an initiating computer;
receiving extracted changes at the initiating computer, in response to acceptance of the synchronization request;
at the initiating computer, updating a local database with the extracted changes;
at the initiating computer, extracting aggregated changes from the local database, wherein the aggregated changes comprise the extracted changes; and
sending the aggregate changes from the initiating computer.

30. The method of claim 29, wherein updating the local database comprises updating the local database with a first set of extracted changes before beginning to update the local database with a second set of extracted changes.

31. The method of claim 29, wherein the initiating computer is associated with a plurality of computers, and wherein sending the aggregate changes comprises sending the aggregate changes from the initiating computer to each computer in the plurality of computers.

32. The method of claim 29, wherein the aggregated changes are compressed by the initiating computer before being sent.

33. The method of claim 29, wherein the extracted changes are decompressed by the initiating computer before updating the local database.

34. The method of claim 29, wherein the extracted changes are expunged by the initiating computer after updating the local database.

35. The method of claim 29, wherein the aggregated changes are expunged by the initiating computer after being sent.

* * * * *

UNITED STATES PATENT AND TRADEMARK OFFICE
CERTIFICATE OF CORRECTION

| | | |
|---|---|---|
| PATENT NO. | : 7,966,285 B2 | Page 1 of 1 |
| APPLICATION NO. | : 12/077887 | |
| DATED | : June 21, 2011 | |
| INVENTOR(S) | : Sawadsky et al. | |

It is certified that error appears in the above-identified patent and that said Letters Patent is hereby corrected as shown below:

Title Page 2, Item (56), under "Other Publications", in Column 2, Line 2, delete "P2p," and insert -- P2P, --.

Column 1, Line 6, delete "APPLICATION" and insert -- APPLICATIONS --.

Signed and Sealed this
Seventeenth Day of January, 2012

David J. Kappos
*Director of the United States Patent and Trademark Office*